Reissued May 10, 1949

Re. 23,111

UNITED STATES PATENT OFFICE 23,111

PROCESS FOR PRODUCING CHLORINE DIOXIDE

Torsten Gustaf Holst, Ornskoldsvik, Sweden, assignor to Mo Och Domsjö Aktiebolag, Ornskoldsvik, Sweden, a limited company of Sweden No Drawing. Original No. 2,373,830, dated April 17, 1945, Serial No. 506,859, October 19, 1943. Application for reissue July 23, 1947, Serial No. 763,177. In Sweden June 2, 1943

14 Claims. (Cl. 23—152)

The present invention relates to a process for producing chlorine dioxide by reacting a metallic chlorate, e. g. sodium chlorate, with a gaseous reducing agent, e. g. sulphur dioxide, which process from a technical point of view is simple to carry out and economically favourable, as compared with previously known methods.

According to the invention, this result is obtained by bringing the gaseous reducing agent to act on the chlorate in an aqueous solution acidified by means of any strong acid, with the exception of halogenic acids, which solution is at least 2-normal with regard to its content of free acid. To this end, according to an appropriate embodiment of said process, the gaseous reducing agent is added in admixture with an inert gas, e. g. air or nitrogen, in a suitable dilution, for instance at a concentration of 5 to 10 per cent by volume of the gas quantity.

By the process according to the invention there is obtained a chlorine dioxide practically free from chlorine (0 to 5 volumes of $Cl_2$ per 100 volumes of $ClO_2$) at a high yield, calculated on the quantity of chlorate consumed. Properly carried out, the process will thus give a yield of at least 90% of the theoretical yield.

Previously it has been proposed (U. S. Patent specification No. 2,089,913) to produce chlorine dioxide (in admixture with chlorine) by reducing an aqueous solution of a metallic chlorate by means of sulphur dioxide. Hereby gas mixtures of $ClO_2$ and $Cl_2$ were obtained, in which the ratio $ClO_2:Cl_2$ was 5 to 10:1.

In comparison with other previously known methods of producing chlorine dioxide, this process involves certain technical advantages which, however, could not outweigh the economical loss ensuing due to the fact that the yield of chlorine dioxide is low. The U. S. patent specification does not clearly give any figures of yield, but it appears from an example of realisation that the yield of chlorine dioxide only amounts to approximately 60%, calculated on the quantity of chlorate consumed, which besides has been confirmed by tests carried out.

Investigations carried out by the inventor have shown that the low yield in said known process is principally due to the fact that a large portion of the sulphur dioxide introduced into the chlorate solution is consumed for the formation of chloride and free sulphurc acid, whereby great losses in chlorate arise. This complete reduction of the chlorate into chloride proceeds according to the formula:

$$NaClO_3+3SO_2+3H_2O \rightarrow NaCl+3H_2SO_4 \quad (1)$$

The reaction proceeds with a considerable development of heat caused by the oxidation of the sulphur dioxide to form sulphuric acid. Only when a certain concentration of the acid has been obtained in the reaction solution, an evolution of chlorine dioxide begins with successively increasing speed, according to the reaction formula:

$$2NaClO_3+SO_2 \rightarrow 2ClO_2+Na_2SO_4 \quad (2)$$

The process has a pronounced autocatalytical course, i. e. it accelerates itself, and after a certain time of reaction the speed of the evolution of $ClO_2$ reaches a maximum, then remains, during some time, comparatively constant, whereupon it rapidly sinks at the end of the process.

By reacting the sulphur dioxide with the chlorine dioxide present in the solution, which reaction may be conceived to proceed according to the reaction formula:

$$2ClO_2+5SO_2+6H_2O \rightarrow 2HCl+5H_2SO_4 \quad (3)$$

there is formed a further amount of sulphuric acid and chloride, whereby inevitable losses ensue. However, to all appearances these are of considerably smaller extent than those caused by a complete reduction of the chlorate into chloride.

On account of the successive increase of the concentrations of the chloride and hydrogen ions during the process, conditions arise permitting a development of chlorine according to the schematic reaction formula:

$$ClO_3^- + 5Cl^- + 6H^+ \rightarrow 3Cl_2 + 3H_2O \quad (4)$$

Of course, this formula only intends to indicate stoichiometrically the gross proportions of chlorate, chloride and hydrogen ions, which are a condition of the development of chlorine, and does not pretend to express exactly the real reaction mechanism, in which certain unstable intermediate products, e. g. $HCl_2$ and $HClO$ are very likely to play an important part.

Finally, the chlorine formed may be reduced by the sulphur dioxide according to the following reaction formula:

$$Cl_2+SO_2+2H_2O \rightarrow 2HCl+H_2SO_4 \quad (5)$$

and, as a result, new amounts of chloride and acid are found.

As will be evident from the above analysis of the reaction, which is based on detailed experimental investigations, extraordinarily complicated conditions exist in the reaction of sulphur dioxide with chlorate solutions, and sources of losses and accompanying low yield of chlorine dioxide are present.

According to the present invention, which is based on the above-mentioned experiences, these losses are avoided to a very great extent due to the fact that the reacting chlorate solution at the time of the reaction is mixed with a certain, sufficient amount of acid, e. g. sulphuric acid, so that a comparatively high concentration of the acid is obtained. The aqueous chlorate solution may thus be said to be acidified "in advance," this expression having the generally adopted meaning of associating an order between two things or events, either in space or in time, in this case the addition of acid and a gaseous reducing agent. The amount of sulphuric acid added must not be too small, nor too great, in order that a high yield of chlorine dioxide may be obtained. It has proved that a concentration of sulphuric acid of 3.5 to 4 mol/litre (7-normal to 8-normal) in the finished reaction mixture yields the best results, but of course the process is not restricted to these concentrations. The chlorate concentration is preferably kept as high as possible, for instance 3-molar or somewhat higher.

In the chlorate solution strongly acidified in the manner just mentioned the presence of free chloric acid, $HClO_3$, is conceivable.

Thus, in the reaction of the sulphur dioxide with the acid chlorate solution a primary reduction of the chloric acid into chlorous acid, $HClO_2$, will probably take place, viz. according to the formula:

$$HClO_3+SO_2+H_2O \rightarrow HClO_2+H_2SO_4 \quad (6)$$

The unstable compound $HClO_2$ primarily formed reacts, however, very rapidly with $HClO_3$ with evolution of chlorine dioxide, $ClO_2$, according to the formula:

$$HClO_2+HClO_3 \rightarrow 2ClO_2+H_2O \quad (7)$$

On account of the fact that the chlorate solution already initially has a high concentration of the acid, the considerable retardation of the evolution of chlorine dioxide is avoided, which retardation sets in when sulphur dioxide is introduced into a neutral or only slightly acid chlorate solution, and causes a productive formation of chloride and sulphuric acid with accompanying loss of chlorate.

An important factor for the favourable carrying out of the process is further the manner in which the gaseous reducing agent, e. g. the sulphur dioxide, is supplied to the acid chlorate solution. It has been found that the concentration should not exceed 10 per cent by volume of $SO_2$ in the inert gas mixture and that the most favourable results are obtained at low contents of $SO_2$, for instance 5 per cent by volume. A good contact between the incoming gas and the liquid reaction mixture is also of essential importance and is most easily obtained by the atomisation of the gas and a vigorous stirring of the liquid.

In this manner it is possible to carry out the reduction of the chlorate into chlorine dioxide with a very good yield and to obtain a chlorine dioxide almost quite free from chlorine and diluted with the inert gas, e. g. air or nitrogen, to such a concentration, for instance 5 per cent by volume, that there will be no risk of explosion.

The process takes place under the above-mentioned conditions with very inconsiderable evolution of heat and may to great advantage be carried out at approximately ordinary temperature, for instance 10 to 40° C., preferably 20 to 25° C. Thus, no measures need be taken for heating or cooling the reaction solution. The rapidity of the reaction and thus the speed of the evolution of chlorine dioxide is essentially controlled by the amount of the gaseous reducing agent supplied per unit of time in diluted form, which renders possible an extraordinarily convenient and reliable control of the reaction.

The formation of chloride is very inconsiderable—only 4 to 5% of the chlorate is converted into chloride at a yield of 90% of $ClO_2$—and depends mainly on a certain unavoidable reduction of the chlorine dioxide by reaction with sulphur dioxide, as already mentioned.

As a result of the low concentration of the chloride in the solution, also the development of chlorine will be extremely inconsiderable—at a yield of 90% of chlorine dioxide, calculated on the amount of chlorate consumed, the average volumetric relation $ClO_2:Cl_2$ in the evolved gas is equal to 30—and, on the whole, hardly asserts itself as long as the concentration of the chlorate is comparatively high.

According to an appropriate embodiment of the process intended to utilise chemicals present in the solution subsequent to the reaction, e. g. sulphuric acid and sodium sulphate, the concentration of the acid of the solution is increased after the decomposition, e. g. by evaporation and, if desired, addition of a further amount of acid, whereupon the solution is cooled, causing acid sulphate of sodium to crystallise out. After the last-mentioned salt has been separated, the concentration of the acid of the solution is adjusted to a suitable value, whereupon the solution is ready to be mixed with fresh chlorate solution and thus be re-introduced into the process.

The process according to the invention may be carried out continuously as well as periodically. The contact between the acid chlorate solution and the gaseous reducing agent may also be effected in different manners, e. g. by permitting the finely divided gas to pass through the acid chlorate solution which is kept in vigorous motion by mechanical stirring.

The manner of carrying out the process according to the invention is further described below by means of the following example of realisation.

*Example*

100 mol 14.5-normal sulphuric acid, prepared from 4 volumes of concentrated $H_2SO_4$ and 6 volumes of water, was mixed with 100 mol of a 46% by weight solution of sodium chlorate (containing 65 gr. $NaClO_3$).

This mixture was introduced into a reaction vessel consisting of a globular flask having a volume of about 0.5 litre and provided with three necks. A mechanically driven stirrer of glass was introduced through the middle one; through the two others respectively supply and discharge of gas was effected.

An even flow of nitrogen having a velocity of 40 litres per hour was mixed with a flow of sulphur dioxide having a velocity of 2 litres per hour. This gas mixture was introduced (at room temperature) into the acid chlorate solution, while the solution all the time was subjected to a very vigorous stirring. Hereby there was obtained in the leaving flow of nitrogen 37.7 gr. of chlorine dioxide at a concentration practically constant during the greater part of the time of test and amounting to about 5 per cent by volume, corresponding to a yield of 92%. The chlorine dioxide evolved was, during the greater part of the process, almost quite free from chlorine $$(ClO_2:Cl_2=50 \text{ to } 100)$$

and appreciable amounts of chlorine could be identified only towards the end.

After complete de-aeration at elevated temperature, the remaining reaction solution was analysed, when inter alia the following results were obtained:

Concentration of chlorate: 0.
Concentration of chloride: 0.1-normal.
Concentration of acid: 8.4-normal.

Having now particularly described the nature of my invention and the manner of its operation, what I claim is:

1. In a process for producing chlorine dioxide by reacting a metallic chlorate with a gaseous reducing agent, the step of bringing the gaseous reducing agent to act upon the chlorate in an aqueous solution acidified in advance by means of any strong acid, with the exception of halogenic acids, said solution being at least 2-normal with regard to its content of free acid.

2. In a process for producing chlorine dioxide by reacting an alkali metal chlorate with gaseous sulphur dioxide, the step of bringing the gaseous sulphur dioxide to act on said alkali metal chlorate in an aqueous solution acidified in advance by means of any strong acid, with the exception of halogenic acids, said solution being at least 2-normal with regard to its content of free acid.

3. In a process for producing chlorine dioxide by reacting sodium chlorate with gaseous sulphur dioxide, the step of bringing the gaseous sulphur dioxide to act on the chlorate in an aqueous solution acidified in advance by means of any strong acid, with the exception of halogenic acids, said solution being at least 2-normal with regard to its content of free acid.

4. In a process for producting chlorine dioxide by reacting sodium chlorate with gaseous sulphur dioxide the steps of bringing the gaseous sulphur dioxide to act on the chlorate in an aqueous solution acidified in advance by means of any strong acid, with the exception of halogenic acids, said solution being at least 2-normal with regard to its content of free acid, and adding the gaseous sulphur dioxide in admixture with an inert gas of the group consisting of air and nitrogen.

5. In a process for producing chlorine dioxide by reacting sodium chlorate with gaseous sulphur dioxide the step of bringing the gaseous sulphur dioxide to act on the chlorate in an aqueous solution acidified in advance by means of any strong acid, with the exception of halogenic acids, the acid used in acidification of the chlorate solution consisting of sulphuric acid and being added in such an amount that the concentration of the acid in the reaction mixture obtained is 6 to 9-normal.

6. In a process for producing chlorine dioxide by reacting sodium chlorate with a gaseous reducing agent to act on the chlorate in an aqueous solution acidified in advance by means of any strong acid, with the exception of halogenic acids, and adding gaseous sulphur dioxide in admixture with an inert gas of the group consisting of air and nitrogen at a concentration of about 5 to 10 per cent by volume of the gas quantity, the acid used in acidification of the chlorate solution consisting of sulphuric acid and being added in such an amount that the concentration of the acid in the reaction mixture obtained is 6 to 9-normal.

7. In a process for producing chlorine dioxide by reacting sodium chlorate with gaseous sulphur dioxide the steps of bringing the gaseous sulphur dioxide to act on the chlorate in an aqueous solution acidified in advance by means of any strong acid, with the exception of halogenic acids, said solution being at least 2-normal with regard to its content of free acid and carrying out the reaction at a temperature of 10 to 40° C.

8. In a process for producing chlorine dioxide by reacting sodium chlorate with gaseous sulphur dioxide the steps of bringing the gaseous sulphur dioxide to act on the chlorate in an aqueoue solution acidified in advance by means of any strong acid, with the exception of halogenic acids, said solution being at least 2-normal with regard to its content of free acid, and adding the gaseous sulphur dioxide in admixture with an inert gas of the group consisting of air and nitrogen at a concentration amounting to about 5 to 10 per cent by volume of the gas quantity and carrying out the reaction at a temperature of 10 to 40° C.

9. In a process for producing chlorine dioxide by reacting sodium chlorate with gaseous sulphur dioxide the steps of bringing the gaseous sulphur dioxide to act on the chlorate in an aqueous solution acidified in advance by means of any strong acid, with the exception of halogenic acids, said solution being at least 2-normal with regard to its content of acid and recovering acid sulphate of sodium, $$NaHSO_4.H_2O$$

from the consumed reaction solution by evaporation and cooling to a suitable temperature for crystallizing out sodium bisulphate, whereupon the remaining solution is used for the renewed reaction with chlorate.

10. In a process for producing chlorine dioxide by reacting sodium chlorate with gaseous sulphur dioxide the steps of bringing the gaseous sulphur dioxide to act on the chlorate in an aqueous solution acidified in advance by means of any strong acid, with the exception of halogenic acids, said solution being at least 2-normal with regard to its content of free acid, and adding the sulphur dioxide in admixture with an inert gas of the group consisting of air and nitrogen at a concentration of about 5 to 10 per cent by volume of the gas quantity, and recovering acid sulphate of sodium, $$NaHSO_4.H_2O$$

from the consumed reaction solution by evaporation and cooling to a suitable temperature for crystallizing out sodium bisulphate, whereupon the remaining solution is used for renewed reaction with chlorate.

11. In a process for producing chlorine dioxide by reacting sodium chlorate with gaseous sulphur dioxide, the steps of bringing the sulphur dioxide to act upon said sodium chlorate in an aqueous solution acidified in advance by means of any strong acid, with the exception of halogenic acids, said solution being at least 2-normal with regard to its content of the acid, and recovering acid sulphate of sodium, $$NaHSO_4.H_2O$$

from the consumed reaction solution by evaporation and addition of sulphuric acid and cooling to a suitable temperature for crystallizing out sodium bisulphate, whereupon the remaining solution is used for the renewed reaction with chlorate.

12. In a process for producing chlorine dioxide by reacting sodium chlorate with gaseous sulphur dioxide the step of bringing the gaseous sulphur dioxide to act on the chlorate in an aqueous solution acidified in advance by means of any strong acid, with the exception of halogenic acids, said solution being at least 2-normal with regard to its content of free acid, the reaction being carried out continuously.

13. Process for producing chlorine dioxide, which comprises bringing gaseous sulphur dioxide to act upon sodium chlorate in an aqueous solution acidified in advance by addition of sulphuric acid in such a quantity that the solution is at least 2-normal with regard to its content of free sulphuric acid.

14. In a process for producing chlorine dioxide by reacting a metallic chlorate with a gaseous reducing agent the step of bringing the gaseous reducing agent to act upon the chlorate in an acidified aqueous solution, said solution being acidified by any strong acid with the exception of halogenic acids, introduced separately from said agent, said solution being at least 2-normal with regard to its content of free acid, the reaction being carried out continuously.

TORSTEN GUSTAF HOLST.

REFERENCES CITED

The following references are of record in the file of this patent:

UNITED STATES PATENTS

| Number | Name | Date |
|---|---|---|
| 1,904,190 | Becher | Apr. 18, 1933 |
| 2,089,913 | Cunningham | Aug. 10, 1937 |

*Note*: These are the references in the file of the original patent, S. N. 2,373,830.